United States Patent Office 3,758,512
Patented Sept. 11, 1973

3,758,512
HYDROGENATION CATALYST
Junichi Kanetaka, Takashi Shimodaira, and Shoichiro Mori, Ibaragi, Japan, assignors to Mitsubishi Petrochemical Co., Ltd., Tokyo, Japan
No Drawing. Continuation of abandoned application Ser. No. 865,966, Oct. 13, 1969. This application Feb. 22, 1972, Ser. No. 228,226
Claims priority, application Japan, Oct. 26, 1968, 43/78,068
Int. Cl. C07d 5/06
U.S. Cl. 260—343.6                                   1 Claim

ABSTRACT OF THE DISCLOSURE

Nickel hydrogenation catalyst comprising nickel, molybdenum and rhenium.

BACKGROUND OF THE INVENTION

This is a continuation of application Ser. No. 865,966, filed Oct. 13, 1969, and now abandoned.

(1) Field of the invention

This invention relates to a nickel hydrogenation catalyst. More particularly, it relates to a novel nickel catalyst which is suitable for catalytically hydrogenating dicarboxylic anhydrides to produce cyclic lactones and cyclic ethers or catalytically hydrogenating cyclic lactones to produce cyclic ethers.

(2) Description of the prior art

Nickel is widely used as the hydrogenation catalyst. In the above-mentioned hydrogenation reactions are also used nickel catalysts, which are disclosed in U.S. Pat. Nos. 2,772,291–3 and British Pat. No. 1,149,784.

However, in the catalytic hydrogenation such as those of dicarboxylic anhydrides and cyclic lactones, which will be accompanied by water and lower organic acids such as butyric or propionic acid formed or by-produced during the reaction or existing originally in the reaction system, the nickel component in nickel catalysts is permanently poisoned and, in the case of an extremity, it is converted to nickel salts which will be dissolved into the reaction solution. Thus, the conventional nickel catalysts known and used heretofore have a drawback in that the catalytic activities are drastically reduced during the reaction.

SUMMARY OF THE INVENTION

It is an object of this invention to provide a novel hydrogenation catalyst without the disadvantages associated with the previously used catalysts as mentioned above but, furthermore, with improved catalytic activities. This invention is based upon the inventors' discovery that the object mentioned above can be accomplished by the use of catalyst composition comprising nickel, molybdenum and rhenium.

The catalyst composition of this invention can be prepared in the conventional way and it may be used either alone or in the form supported on a carrier. The carrier may be introduced by a variety of methods. However, it is preferable to prepare the catalyst in the form supported on a carrier in such a manner as described below.

Preparation of the catalyst composition may be carried out by intimately combining together on a carrier (1) a nickel compound which is decomposed to metallic nickel by heating in a reducing atmosphere, (2) molybdenum compound which is decomposed to metallic molybdenum or molybdenum sub-oxides in a reducing atmosphere and (3) a rhenium compound which is decomposed to metallic rhenium in a reducing atmosphere and heating the resulting combined mass in a reducing atmosphere.

The above-mentioned steps may be conducted by a variety of methods. In intimately combining the above three compounds, it is preferable that a carrier is introduced by impregnating the same with solution; the compounds that are to be combined toegther or precursors or derivatives thereof are preferably introduced on the carrier in the form of solution, preferably in aqueous solution. For this purpose, there may be adopted a method in which the particular solutions of said nickel, molybdenum and rhenium compounds, or a mixture of these solutions, are used to impregnate a carrier. Alternatively, the nickel compound may be first precipitated on a carrier which is then impregnated with the particular aqueous solutions of molybdenum and rhenium compounds or a mixture of these solutions. Any of the methods described above and other adequate methods may be employed, but the method involving precipitation of the nickel compound and subsequent addition of the molybdenum and rhenium compounds is particularly preferred.

In the method referred to above, the nickel salt is preferably water soluble and thermally decomposable and nickel nitrate and nickel formate are most preferable. However, other nickel salts usually used for the nickel catalyst may be also employed. As the carrier is usually used diatomaceous earth and any carrier which is used for supporting a catalyst such as silica gel, alumina or silica-alumina may be conveniently employed. Among the carriers mentioned above silica-alumina is particularly effective because of its ability to improve catalytic activity and life of the hydrogenation catalyst.

In preparing the catalyst composition, the nickel salt and the carrier are kneaded together, followed by addition of an aqueous solution containing a precipitating agent to insolubilize said water soluble nickel salt, thereby depositing the precipitation of nickel component on the carrier. Any precipitating agent that is used in the production of nickel catalyst supported on a carrier, e.g. ammonium carbonate, sodium carbonate or sodium bicarbonate, may be employed in this invention.

To the resulting product is added an aqueous solution containing a molybdenum compound and a rhenium compound and the mixture are kneaded and dried at a temperature of about 110–130° C. After thoroughly dried the resulting mass is reduced under hydrogen. If rhenium heptoxide, which is vaporizable, is used as the rhenium compound, it is preferable to subject the rhenium compound in advance to reduction by treating it in a hydrogen stream at about 150–250° C. for 1–3 hours to convert the rhenium heptoxide to the sub-oxide. After such a pretreatment as above the combined mass containing the nickel, molybdenum and rhenium compounds is subjected to hydrogenative reduction by treating it under hydrogen at a temperature of 300–600° C., preferably at about 400–450° C., for 2–4 hours to give the catalyst composition of this invention. A longer period of time (10–20 hours) will be required for the hydrogenative reduction at a lower temperature of about 300° C. whereas reduction in activity by sintering tends to occur at a higher temperature of about 600° C.

The molybdenum compound used as the starting material for the catalyst composition is preferably one that is water soluble and easily decomposable on heating in a reducing atmosphere to leave nothing but the molybdenum component as the catalytic component such as ammonium molybdate. As the rhenium compound for the catalyst composition it is preferable to use one that has similar properties to those of the above-mentioned molybdenum compound and rhenium heptoxide and ammonium perrhenate are preferred.

The catalyst composition of this invention may be formed into a desirable shape by adding a suitable binder at any stage in the course of preparation, if required.

The catalyst composition thus prepared is, like other reduced nickel catalysts, spontaneously combustible upon contacting with air. However, the catalyst composition may be modified for the convenient use free from hazardous combustion upon contacting with air by means of conventional methods adopted for stabilizing the nickel catalyst, for example, by treating the catalyst composition with carbon dioxide or air diluted with an inert gas.

Although it is not necessary to limit the rhenium content of the catalyst, consideration of the cost of catalyst should be made with respect to the content as rhenium is an expensive component as compared with nickel and molybdenum. Accordingly, it is preferable to use at an atomic ratio of rhenium to nickel below 0.2, particularly below 0.1.

Such a molybdenum content of the catalyst is employed that the atomic ratio of molybdenum to nickel is below 0.2 and it is preferable to determine the atomic ratio to nickel between 0.02 and 0.09.

The nickel hydrogenation catalyst composition according to the present invention may be used for promoting the hydrogenation reactions similar to those using the previously used nickel catalysts. It has a catalytic activity in the hydrogenation of an ethylenically unsaturated bond such as production of succinic anhydride from maleic anhydride. The catalyst composition of this invention is particularly suitable for the hydrogenation of a carbonyl group such as production of cyclic lactones and/or cyclic ethers from dicarboxylic anhydrides. In addition, the catalyst composition is characteristic in that not only it has a very high catalytic activity but also its catalytic life is extremely long and it is highly valuable from an industrial point of view.

DESCRIPTION OF PREFERRED EMBODIMENTS

The examples below are described with reference to maleic or succinic anhydride as a starting material to be hydrogenated because the anhydrides are typical to understand hydrogenation of carbonyl group. The examples will serve to illustrate this invention more fully and practically. It should not be construed, however, that these examples restrict this invention as they are given merely by way of illustration.

EXAMPLE I

The catalyst was prepared by the following procedures:

To an aqueous solution of 500 g. of nickel nitrate [$Ni(NO_3)_2 \cdot 6H_2O$] in 400 g. of distilled water were added 100 g. of powdery diatomaceous earth. The mixture was kneaded in a kneader for one hour. To the resulting slurry colored in dark green was added with stirring an aqueous solution of 200 g. of ammonium carbonate [$(NH_4)_2CO_3$] in 400 g. of distilled water in small portions. The yellowish green precipitates thus formed was separated by filtration and washed two portions of 200 g. of distilled water, followed by drying at 110–120° C. for 24 hours. There were produced 270 g. of powdery basic nickel carbonate supported on diatomaceous earth. To 15 g. of the powders thus obtained are added 0.3 g. of rhenium heptoxide and 0 g. (catalyst–1), 0.4 g. (catalyst–2), 0.8 g. (catalyst–3), or 1.2 g. (catalyst–4) of ammonium molybdate, respectively in aqueous solution. The mixtures were kneaded and then dried at 110–120° C. for 12 hours. They were then reduced in a hydrogen stream at 150–250° C. for one hour and at 450° C. for additional 3 hours.

The catalyst after the hydrogenative reduction was cooled to 150° C. and allowed to stand overnight under carbon dioxide in place of the hydrogen. After the treatment with carbon dioxide the catalyst was gradually contacted with air diluted with nitrogen, when the catalyst generated heat and maintained at temperatures below 50° C.

The nickel component of the catalyst thus prepared was analyzed to be 40% by weight.

Catalytic hydrogenation of 0.4 mole (40 g.) of succinic anhydride was carried out using 2 g. of each of the nickel catalysts 1–4 in a 100-cc. autoclave equipped with an electromagnetic stirrer at a reaction pressure of 120 kg./cm.$^2$ and a reaction temperature of 260° C. for 3 hours. After completion of the reaction, the reaction product was separated from the catalyst and subjected to gas chromatographic analysis using diethyl ketone as an internal standard and the compositions of the reaction products were determined as shown in Table I. In the table are omitted values for water, succinic anhydride and succinic acid.

TABLE I

| Catalyst No. | Atomic ratio of rhenium to nickel (Re/Ni) | Atomic ratio of molybdenum to nickel (Mo/Ni) | Composition of reaction product (wt. percent) | | | | | |
|---|---|---|---|---|---|---|---|---|
| | | | γ-Butyrolactone | Tetrahydrofuran | n-Propanol | n-Butanol | Propionic acid | Butyric acid |
| 1 | 0.018 | 0 | 51.5 | 14.0 | 1.5 | 0.8 | 1.2 | 0.5 |
| 2 | 0.018 | 0.035 | 35.2 | 27.5 | 5.6 | 2.3 | 2.1 | 1.3 |
| 3 | 0.018 | 0.070 | 34.2 | 26.4 | 3.3 | 2.6 | 0.9 | 1.0 |
| 4 | 0.018 | 0.105 | 47.1 | 14.5 | 1.5 | 1.3 | 1.0 | 1.0 |

EXAMPLE II

To 15 g. of the powdery basic nickel carbonate supported on diatomaceous earth used in Example I were added 0.5 g. of rhenium heptoxide and 0 g. (catalyst–5), 0.4 g. (catalyst–6), 0.8 g. (catalyst–7), or 1.2 g. (catalyst–8) of ammonium molybdate, respectively in aqueous solution. The mixture were treated in the same way as in Example I to prepare the catalysts. The reaction was carried out under the same conditions as in Example I, using 2 g. of the catalyst and 40 g. of succinic anhydride in a 100-cc. autoclave at a reaction temperature of 260° C. and a reaction pressure of 120 kg./cm.$^2$ for 3 hours. The compositions of the reaction products are shown in Table II.

TABLE II

| Catalyst No. | Atomic ratio of rhenium to nickel (Re/Ni) | Atomic ratio of molybdenum to nickel (Mo/Ni) | Composition of reaction product (wt. percent) | | | | | |
|---|---|---|---|---|---|---|---|---|
| | | | γ-Butyrolactone | Tetrahydrofuran | n-Propanol | n-Butanol | Propionic acid | Butyric acid |
| 5 | 0.03 | 0 | 35.2 | 19.9 | 5.2 | 1.7 | 1.3 | 0.3 |
| 6 | 0.03 | 0.035 | 33.5 | 27.0 | 4.4 | 2.4 | 2.4 | 1.1 |
| 7 | 0.03 | 0.070 | 27.1 | 30.2 | 6.6 | 3.7 | 1.7 | 1.0 |
| 8 | 0.03 | 0.105 | 44.9 | 18.0 | 2.3 | 1.5 | 1.1 | 1.1 |

EXAMPLE III

To an aqueous solution of 500 g. of nickel nitrate in 400 g. of distilled water were added 100 g. of silica-alumina (100 mesh; ketjen LA-3P). The mixture was kneaded in a kneader for one hour. To the deep green slurry thus obtained was added with stirring an aqueous solution of 200 g. of ammonium carbonate in 400 g. of distilled water in small portions. The yellowish green precipitates thus formed were separated by filtration and washed with two portions of 200 g. of distilled water, followed by drying at 110–120° C. for 24 hours. There were produced 270 g. of powdery basic nickel carbonate supported on silica-alumina.

To 30 g. of the powders thus obtained are added 1 g. of rhenium heptoxide and 1.6 g. of ammonium molybdate, respectively in aqueous solution. The mixture was kneaded and dried at 110–120° C. for 12 hours. It was then reduced in a hydrogen stream at 150–250° C. for one hour and at 450° C. for additional 3 hours.

The catalyst thus prepared was treated with carbon dioxide in the same way as in Example I.

In a 100-cc. autoclave equipped with a electromagnetic stirrer were placed 2 g. of the catalyst. Catalytic hydrogenation reaction of 0.4 mole (40 g.) of succinic anhydride was carried out in the autoclave by contacting with hydrogen at a reaction pressure of 120 kg./cm.$^2$ and a reaction temperature of 260° C. for 3 hours. After completion of the reaction the reaction product was separated from the catalyst and subjected to gas chromatographic analysis using diethyl ketone as an internal standard. The composition of the reaction product was as follows: γ-Butyrolactone, 22.3 wt. percent; tetrahydrofuran, 32.5 wt. percent; propanol, 4.9 wt. percent; butanol, 2.0 wt. percent; propionic acid, 1.1 wt. percent; butyric acid, 0.6 wt. percent.

EXAMPLE IV

Continuous hydrogenation reactions of maleic anhydride were carried out using the catalyst-7 supported on diatomaceous earth in Example I and the catalyst supported on silica-alumina in Example III, respectively.

The reaction vessel used was an autoclave, 11 cm. in inner diameter and 23 cm. in height, equipped with an electromagnetically driven stirrer and a condenser, 1.6 cm. in inner diameter and 70 cm. in height, on the top. The starting maleic anhydride is charged into the reaction phase with the above-mentioned catalyst suspended, and the reaction product discharged with the excess hydrogen gas from the reaction zone in the form of vapor. The composition of the vapor phase can be adequately controlled by controlling the flow rate of hydrogen gas introduced from the bottom of the reaction vessel and the temperature of the condenser.

The reaction vessel was continuously operated for 150 hours with an initial charge of 1 kg. of a mixture consisted of 60% by weight of γ-butyrolactone and 40% by weight of succinic anhydride and 30 g. of the above-cited catalyst while maintaining a constant volume of the liquid in the reaction vessel by continuously introducing the starting material maleic anhydride. The reaction conditions were as follows: Reaction pressure, 120 kg./cm.$^2$; flow rate of hydrogen, 1800 liters per hour; temperature set for the condenser, 200° C. The reaction temperatures were 250° C. with the catalyst supported on diatomaceous earth and 240° C. with the catalyst supported on silica-alumina.

Change with time of activities of the catalysts forming tetrahydrofuran is shown in the table below.

| | Rate of tetrahydrofuran formation (g./hr.) | | |
|---|---|---|---|
| Time elapsed (hr.) | 50 | 100 | 150 |
| Catalyst on diatomaceous earth | 78 | 69 | 68 |
| Catalyst on silica-alumina | 90 | 88 | 87 |

What is claimed is:

1. A process for the production of gamma-butyrolactone and tetrahydrofuran by the hydrogenation of an anhydride selected from the group consisting of maleic anhydride and succinic anhydride in the presence of a catalytically effective amount of a catalyst containing nickel, rhenium, and molybdenum, wherein the atomic ratio of rhenium to nickel is below 0.2, and the atomic ratio of molybdenum to nickel is from about 0.02 to about 0.09.

References Cited
UNITED STATES PATENTS 3,492,314    1/1970    Asano et al.    260—343.6

ALEX MAZEL, Primary Examiner

A. M. T. TIGHE, Assistant Examiner

U.S. Cl. X.R.

252—455, 458, 461, 470; 260—346.1 R, 540, 617 C